UNITED STATES PATENT OFFICE.

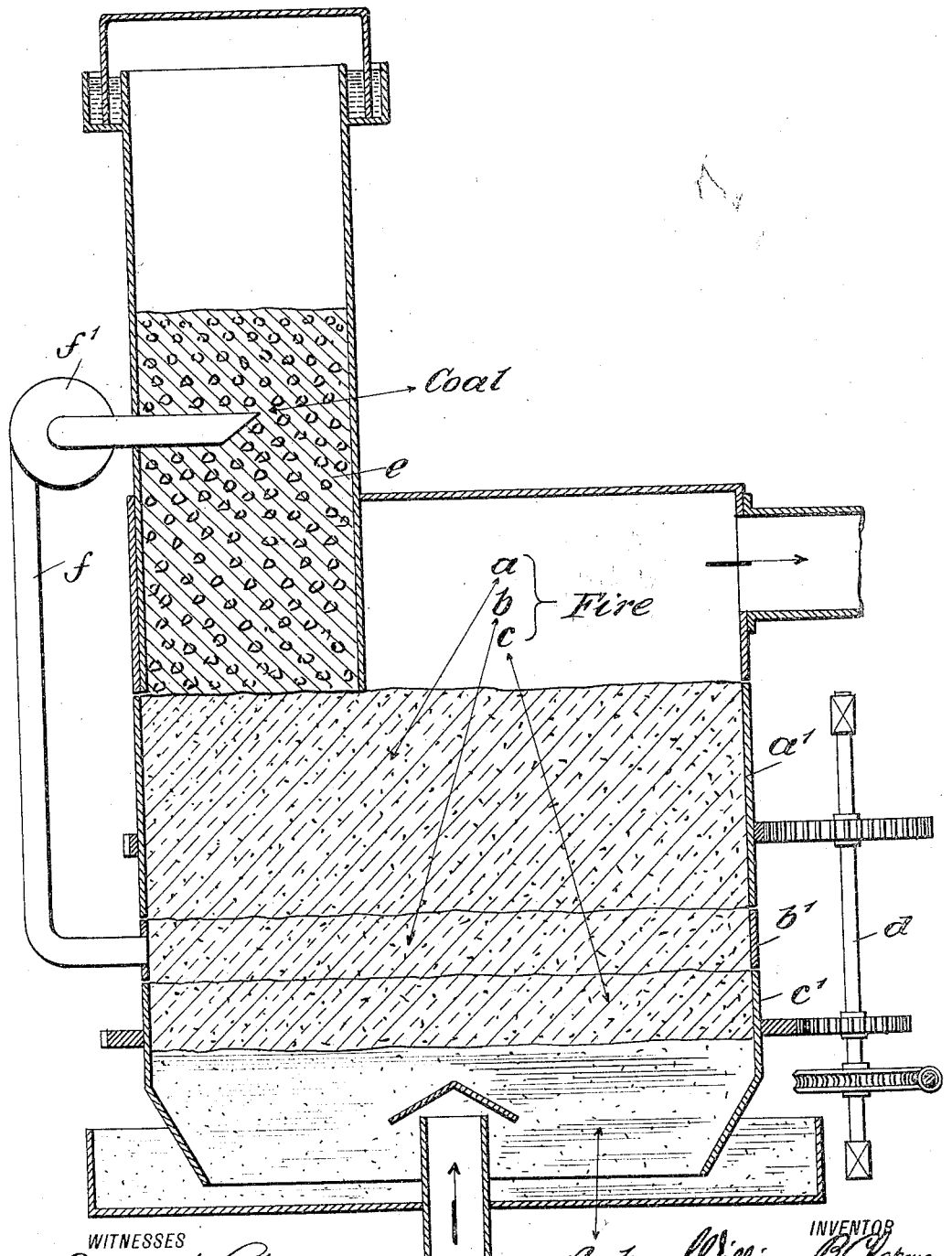

WILLIAM B. CHAPMAN, OF BROOKLYN, NEW YORK, ASSIGNOR TO CHAPMAN ENGINEERING CO., OF NEW YORK, N. Y.

ART OF GENERATING GAS.

1,125,962.

Specification of Letters Patent.

Patented Jan. 26, 1915.

Application filed November 23, 1908. Serial No. 464,149.

*To all whom it may concern:*

Be it known that I, WILLIAM B. CHAPMAN, of the borough of Brooklyn, county of Kings, State of New York, have invented certain new and useful Improvements in the Art of Generating Gas, of which the following is a full, clear, and exact specification, such as will enable others skilled in the art to which it appertains to make and use the same.

My invention relates to the generation of gas from coal and other fuels in what are usually termed producers; and it resides in certain acts or steps concerning the fuel and gas which will be fully set forth hereinafter and particularly pointed out in the claims.

The accompanying diagram represents in vertical section one of the various apparatus by which my improved art or process may be practised.

In the generation of gas by such processes as those to which my invention relates difficulty is experienced by reason of the formation, in the body of incandescent fuel, of what are termed blow holes or chimneys; *i. e.* open passages or channels in the fuel through which the air blast or current finds easy passage without spreading through the fuel. The result is that a large quantity of $CO_2$ is produced and much waste is entailed. In addition to this, gas of non-uniform character is generated and reliable operations are impossible. Agitation by stirring devices in various ways has been attempted, but always without complete success, owing principally to the impossibility of preserving uniform density throughout any horizontal plane of the fuel bed, also to the difficulty of protecting the stirring devices from the intense heat incident to the process, and to the impossibility of securing uniform distribution of the air blast.

In processes of this nature if ordinary bituminous coals are used the gas given off by the fuel when it is first brought under the influence of the heat is heavily charged with tar and other bituminous substances which render the gas unfit for use in gas engines and even for transmission through small flues or pipes, unless the gas is thoroughly washed and scrubbed. This washing and scouring process not only involves complicated machinery and a large waste of water and power, but robs the gas of its richest heat producing constituents and is therefore, most uneconomical from the standpoint of thermal efficiency.

My present invention overcomes these difficulties; and in accordance with the invention, I cause portions of the incandescent fuel bed to move bodily with reference to each other and I cause the rich tarry gas from the upper part of the producer to pass downward and introduce it into the body of incandescent fuel at or near the point of relative motion thereof. By these operations all blow holes in formation are broken down and the fuel forced to take compact form, while the tarry constituent of the rich gas introduce into the moving fuel is so acted on by the incandescent carbon as to "fix" or render permanent the gas and allow it to be easily cleansed and prepared for use either as heat or power gas. Owing to the continual movement of the fuel two important results are attained with regard to the blast of tarry gas; first, the gas is forced to spread over and through the mass of fuel, insuring uniform results and utilization of all the heat in the glowing fuel for the transformation of the gas and second, the tendency of the blast of gas to travel through a fixed path in a concentrated current is entirely resisted and the formation of blow holes thereby prevented.

Preferably the relative motion of the two or more bodies of fuel is effected by rotating them horizontally either in opposite directions or in the same direction at different speeds. In the diagram $a$, $b$ and $c$ represent three superimposed sections of the incandescent or glowing fuel, of which the narrow intermediate body is stationary and the top and bottom bodies are rotated at different speeds. This may be effected by various contrivances one of which, that shown in the diagram, consists in making the body of the producer in sections of which the sections $a'$ and $c'$ are rotatable by a suitable gearing such as $d$.

Again referring to the diagram, $e$ represents a body of fuel superimposed upon the fire $a$ and inclosed from atmospheric communication. This fuel $e$ thus exposed to the heat of the fire gives off a rich, tarry gas which is by-passed, for example through a duct $f$ and fan $f'$, into the burning fuel, preferably though not necessarily, at the level of the stationary body of fuel $b$. The result of these operations is that the bodies of burning fuel are constantly twisted or turned on each other and maintained in compact form notwithstanding the strong tendency of the blast of gas from the by-pass $f$, to form a blow hole through the fuel. Further, the mass of "green" coal or other fuel $e$ is maintained over the point of admission of the gas to the burning fuel and this forces the gas to take a diagonal course through the body $a$ of the burning fuel. The fuel $e$ gradually feeds down into the fire to replenish the supply as the fuel therein is consumed. The tarry gas passed through the moving fuel bed is cleansed of its impurities and passed from the operation as a clean fixed gas which requires little further treatment and which may be safely transmitted through comparatively small flues without danger of clogging them.

In connection with the introduction of the tarry gas into the incandescent fuel, it is pointed out that to attain the best results the gas should be introduced into the interior of the mass of burning fuel at a point removed to some extent from the air supply. This prevents any material mixture of the air and gas and consequently avoids combustion of the gas and insures that the gas is passed through and acted on by the incandescent carbon bringing about the desired transformation of the gas. Thus, in the diagram, supposing an upward draft through the fire, the tarry gas from the fuel body $e$ is introduced into the middle body $b$ of the fire, removed from the air supply below.

Certain of the subject-matter claimed in this application is disclosed but not claimed in my co-pending application Serial Number 293,754, filed December 29, 1905.

Having thus described my invention, what I claim as new and desire to secure by Letters Patent of the United States is:

1. The improvement in the art of generating gas which consists in maintaining a mass of incandescent or glowing fuel agitating said incandescent fuel maintaining a mass of unburned fuel in proximity to and subject to the heat of the incandescent fuel, and causing the gas given off by the unburned fuel to pass into the mass of incandescent fuel, during the agitation of the latter.

2. The improvement in the art of generating gas which consists in maintaining a mass of incandescent or glowing fuel maintaining a mass of unburned fuel in proximity to and subject to the heat of the incandescent fuel forcing the gas given off by the unburned fuel into the mass of incandescent fuel and causing motion of one portion of said mass of incandescent fuel bodily with respect to another portion of said incandescent mass.

3. The improvement in the art of generating gas which consists in maintaining a mass of incandescent or glowing fuel, maintaining a mass of unburned fuel in proximity to and subject to the heat of the incandescent fuel, and in withdrawing the gas given off by the unburned fuel and introducing it into the mass of incandescent fuel at a point between two relatively moving portions of said mass of incandescent fuel.

4. The improvement in the art of generating gas which consists in maintaining a mass of incandescent or glowing fuel, maintaining a mass of unburned fuel in proximity to and subject to the heat of the incandescent fuel, withdrawing the gas given off by the unburned fuel and introducing it into the mass of incandescent fuel at a point below a bodily moving portion of such mass of incandescent fuel.

5. The improvement in the art of generating gas which consists in maintaining a mass of incandescent fuel, causing motion of a portion of said mass bodily with respect to another portion of said incandescent mass, maintaining a mass of unburned fuel in proximity to and subject to the heat of the incandescent fuel and inclosed from the atmosphere, and in withdrawing the gas given off by the unburned fuel and introducing it into the stationary portion of the mass of incandescent fuel.

6. The improvement in the art of generating gas which consists in maintaining a mass of incandescent or glowing fuel, maintaining a mass of unburned fuel in proximity to and subject to the heat of the incandescent fuel, withdrawing the gas given by the unburned fuel and introducing it into the mass of incandescent fuel at a point below a continuously agitated portion of such mass of incandescent fuel.

7. The improvement in the art of generating gas which consists in maintaining a mass of fuel, supporting upon a portion only thereof at one side of the center a second mass of fuel, and rotating said first-mentioned mass of fuel to agitate the same and to distribute the second-mentioned mass of fuel over said first-mentioned mass.

8. The improvement in the art of generating gas which consists in maintaining a mass of incandescent or glowing fuel, supporting upon a portion only thereof adjacent the periphery a mass of unburned fuel rotating one of said masses in respect to the other to distribute the unburned fuel over said incandescent fuel and withdrawing the gas given by the unburned fuel and introducing it into the mass of incandescent fuel.

9. The improvement in the art of generating gas which consists in maintaining a mass of incandescent or glowing fuel, supporting upon a portion only thereof at one side of the center a mass of unburned fuel, rotating one of said masses in respect to the other to distribute the unburned fuel over said incandescent fuel withdrawing the gas given off by the unburned fuel and introducing it into the mass of incandescent fuel and withdrawing the gas given off by the incandescent fuel.

10. The improvement in the art of generating gas which consists of maintaining a mass of incandescent fuel maintaining a mass of unburned fuel in proximity to and subject to the heat of the incandescent fuel, withdrawing the gas given off by the unburned fuel and introducing it into the mass of incandescent fuel, rotating one of said masses in respect to the other to distribute the unburned fuel thereover and withdrawing the gas given off by the incandescent fuel separately from that given off from the unburned fuel.

11. The improvement in the art of generating gas which consists in maintaining a mass of fuel, supporting upon a portion only thereof adjacent the periphery a second mass of fuel, rotating said first-mentioned mass to distribute the second-mentioned mass thereover, withdrawing the gas given off by the second-mentioned mass and introducing said gas into the first-mentioned mass, a portion of said first-mentioned mass being maintained incandescent and fresh fuel being supplied to said second-mentioned mass.

12. The improvement in the art of generating gas which consists in maintaining a mass of burning fuel, supporting upon a portion only thereof a second mass, of fuel subjected to the heat of the first-mentioned mass moving one of said masses in respect to the other in a horizontal plane to distribute the second-mentioned mass over the surface of the first-mentioned mass and forcing the gas given off from the second-mentioned mass into contact with the first mentioned mass.

13. The improvement in the art of generating gas which consists in maintaining a mass of burning fuel, supporting upon a portion only thereof a second mass of fuel subjected to heat of the first-mentioned fuel, rotating one of said masses in respect to the other to distribute the second-mentioned mass over the surface of the first-mentioned mass and causing the gas given off from the second-mentioned mass to pass into contact with the first-mentioned mass.

In testimony whereof I have signed my name to this specification in the presence of two subscribing witnesses.

WILLIAM B. CHAPMAN.

Witnesses:
   Isaac B. Owens,
   Randolph Owens.